United States Patent
Schade et al.

(10) Patent No.: US 6,859,696 B2
(45) Date of Patent: Feb. 22, 2005

(54) SYSTEM AND METHOD FOR MONITORING MACHINE STATUS

(75) Inventors: Marc Schade, Kiel (DE); James W. Landes, East Peoria, IL (US); Mark J. Hilbert, Peoria, IL (US)

(73) Assignee: Caterpillar Inc, Peoria, IL (US)

(*) Notice: Subject to any disclaimer, the term of this patent is extended or adjusted under 35 U.S.C. 154(b) by 60 days.

(21) Appl. No.: 10/303,062

(22) Filed: Nov. 25, 2002

(65) Prior Publication Data

US 2003/0125852 A1 Jul. 3, 2003

Related U.S. Application Data

(60) Provisional application No. 60/342,727, filed on Dec. 27, 2001.

(51) Int. Cl.[7] .................................................. G06G 7/76
(52) U.S. Cl. .................... 701/29; 340/426.15; 324/605; 324/606
(58) Field of Search ............................ 701/29, 31, 34, 701/35; 340/438, 425.5, 426.15, 461; 324/605, 609, 606

(56) References Cited

U.S. PATENT DOCUMENTS

| 5,303,163 | A | | 4/1994 | Ebaugh et al. ............... 700/274 |
|---|---|---|---|---|
| 5,848,365 | A | | 12/1998 | Coverdill ....................... 701/50 |
| 5,890,080 | A | | 3/1999 | Coverdill et al. .............. 701/29 |
| 6,112,150 | A | * | 8/2000 | Irons et al. ................... 701/114 |
| 6,334,081 | B1 | * | 12/2001 | Robinson et al. .............. 701/48 |
| 6,338,010 | B1 | * | 1/2002 | Sparks et al. ................... 701/1 |
| 6,360,145 | B1 | * | 3/2002 | Robinson ..................... 701/35 |

* cited by examiner

Primary Examiner—Thomas G. Black
Assistant Examiner—Arthur D. Donnelly
(74) Attorney, Agent, or Firm—Finnegan, Henderson, Farabow, Garrett & Dunner

(57) ABSTRACT

A method is provided for monitoring communications in a machine including electronic control module (ECM) components connected via datalinks. A message is received on a datalink. The source address of the received message is determined. The received message is added to an address list based on the source address, and the address list is evaluated to determine the status of a datalink associated with each ECM component.

16 Claims, 3 Drawing Sheets

SYSTEM AND METHOD FOR MONITORING MACHINE STATUS

CROSS REFERENCE TO RELATED APPLICATIONS

This application claims the benefit of U.S. Provisional Application No. 60/342,727, filed Dec. 27, 2001, the contents of which are hereby incorporated by reference.

TECHNICAL FIELD

The present invention relates generally to monitoring machines and, more particularly, to a system and method for monitoring datalinks associated with vehicle components.

BACKGROUND

Electronic control systems are used extensively in on-highway vehicles to perform a variety of operations. Some exemplary uses of electronic control systems include controlling transmission, cruise control, and/or anti-lock braking systems. As the use of these electronic control modules (or ECMs) increases, the level of complexity of communication between these systems and the vehicle also increases.

In order to deal with these increasingly complex communications, the Society of Automotive Engineers (SAE) has developed standards pertaining to the network of communications between electronic devices in vehicles. One of these standards is J1939. The J1939 standard specifies a high-speed communications network to support real-time closed loop control functions between ECMs, which may be physically distributed throughout the vehicle and may include a series of datalinks to each particular ECM.

A problem may arise when the datalink to a particular ECM becomes inoperative, or stops communicating. It is possible that the datalink may be inoperative without the vehicle's operator or a service technician knowing this. Because the operator or technician may be unaware that the vehicle failure is due to the datalink problem, the operator or technician may spend valuable time trouble-shooting the ECM or other vehicle systems to determine the cause of the vehicle behavior.

Systems currently exist that diagnose problems in electrical systems in vehicles. For example, U.S. Pat. No. 5,848,365, entitled "Diagnostic Method and System for Electrical System in a Truck" measures and stores voltages that are present on electrical connections during a time period prior to and after an event, such as an electrical fault. This system requires, however, that a technician have either knowledge of vehicle wiring and voltages, or conversely, have access to an external computer including diagnostic software. This system does not provide easy monitoring of the J1939 system in the field, nor does it provide for efficient repair of a problem.

The present invention is directed to overcoming one or more of the problems or disadvantages associated with the prior art.

SUMMARY OF THE INVENTION

A method is provided for monitoring communications in a machine including electronic control module (ECM) components connected via datalinks. A message is received on a datalink. The source address of the received message is determined. The received message is added to an address list based on the source address, and the address list is evaluated to determine the status of a datalink associated with each ECM component.

A system is provided for monitoring communications in a machine including electronic control module (ECM) components connected via datalinks. The system includes an electronic service tool system, wherein the electronic service tool system includes a microprocessor configured to monitor communications in the machine by receiving a message on a datalink, determining the source address of the message, adding the received message to an address list, and evaluating the address list to determine the status of a datalink associated with each ECM component.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
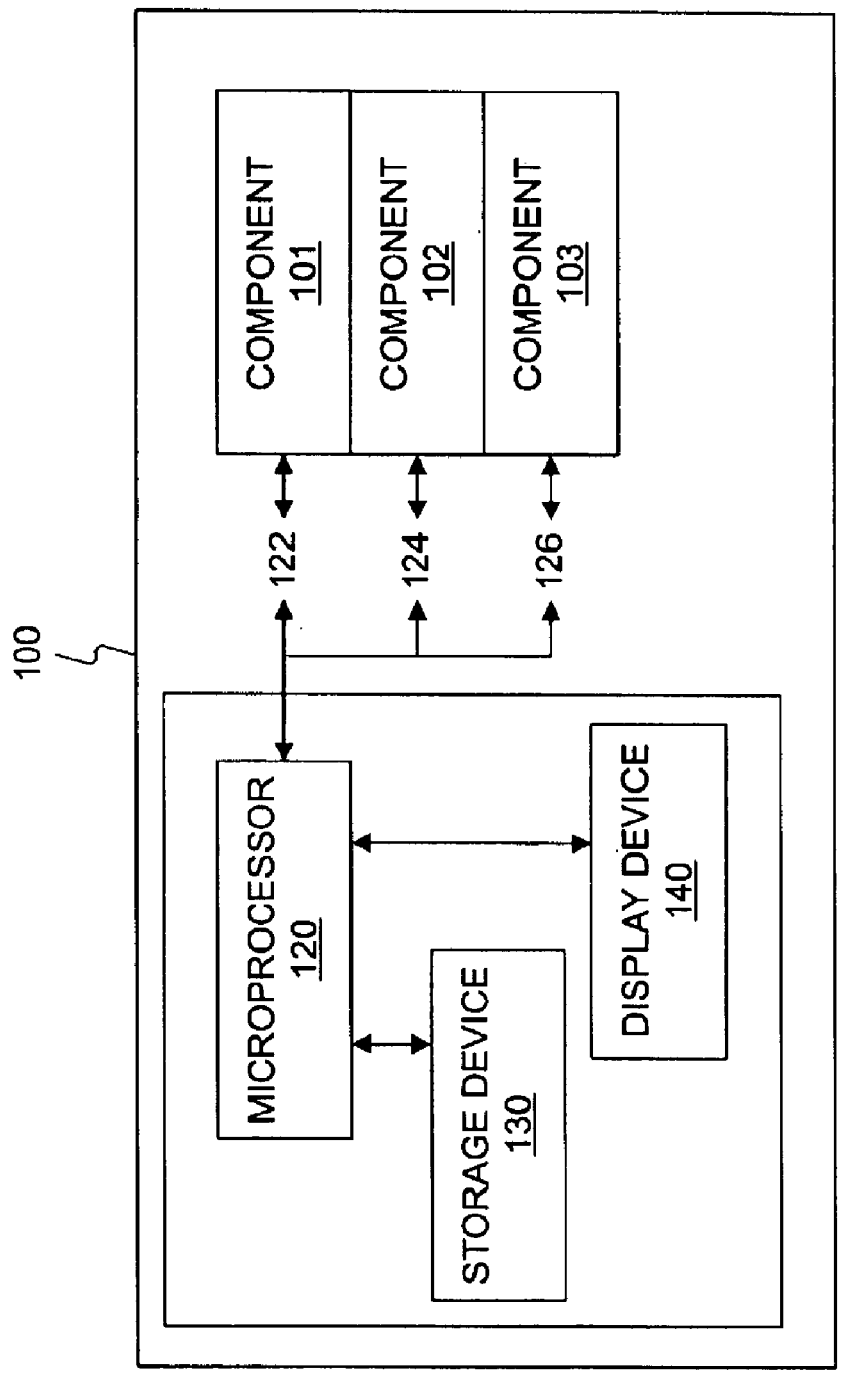
FIG. 1 is a block diagram illustrating a machine including an electronic service tool component, consistent with one exemplary embodiment of the present invention.

A system and method are provided for monitoring communication in a machine, such as a vehicle, including at least one electronic control module (ECM). FIG. 1 diagrammatically illustrates a machine 100 consistent with principles of the present invention. In exemplary embodiments of the present invention, machine 100 may include a vehicle. However, in alternative embodiments, machine 100 could include immobile mechanisms, such as a stationary engine used for generating power. As illustrated, machine 100 may include ECM component 101, ECM component 102, and ECM component 103. ECM components 101–103, for example, may include an electronically controlled transmission, anti-lock braking system, and/or cruise control, or may include any other system suitable for ECM control. Machine 100 also may include control and electronic service tool system 110. Control and electronic service tool system 110 may coordinate communication between machine 100 and ECM components 101–103 and further, may monitor these communications. Control and electronic service tool system 110 may include a microprocessor 120, a storage device 130, and a display device 140.

Microprocessor 120 may be implemented in various environments to provide the tools for monitoring the status of communication in machine 100, such as, for example, J1939 communications. While the present invention has particular applicability to J1939 communications, the invention may also be applicable to other communications standards. Microprocessor 120 may include hardware specifically constructed for performing various processes and operations of the invention or may include a general purpose computer or computing platform selectively activated or reconfigured by program code to provide the necessary functionality. Microprocessor 120 is connected to ECM components 101–103 via datalinks 122, 124, and 126, respectively, for receiving data from, and sending instructions to, ECM components 101–103. Storage device 130 may include information received by microprocessor 120 from datalinks 122, 124, and 126. Further, storage device 130 may include instructions for monitoring communication in machine 100. Finally, display device 140 may include a screen for displaying the status of monitored communication.

Alternatively, control and electronic service tool system 110 may consist of two separate modules. In this alternative embodiment, a microprocessor (not shown) may be mounted in machine 100 and function to coordinate communication between ECM components 101–103 and machine 100. This microprocessor would function as the separate control system. The separate electronic service tool (illustrated by reference numeral 110) would then be able to be operated while not mounted to machine 100. For example, a service technician in the field may have an electronic service tool 110, including a microprocessor 120, a storage device 130, and a display device 140. The technician could then attach this electronic service tool 110 to the microprocessor (not shown) of the vehicle's separate control system to monitor communication between machine 100 and ECM components 101–103. The electronic service tool 110 may attach to the microprocessor (not shown) via hardwire link or via wireless connection, such as modem or infrared technology.

Figure 2:
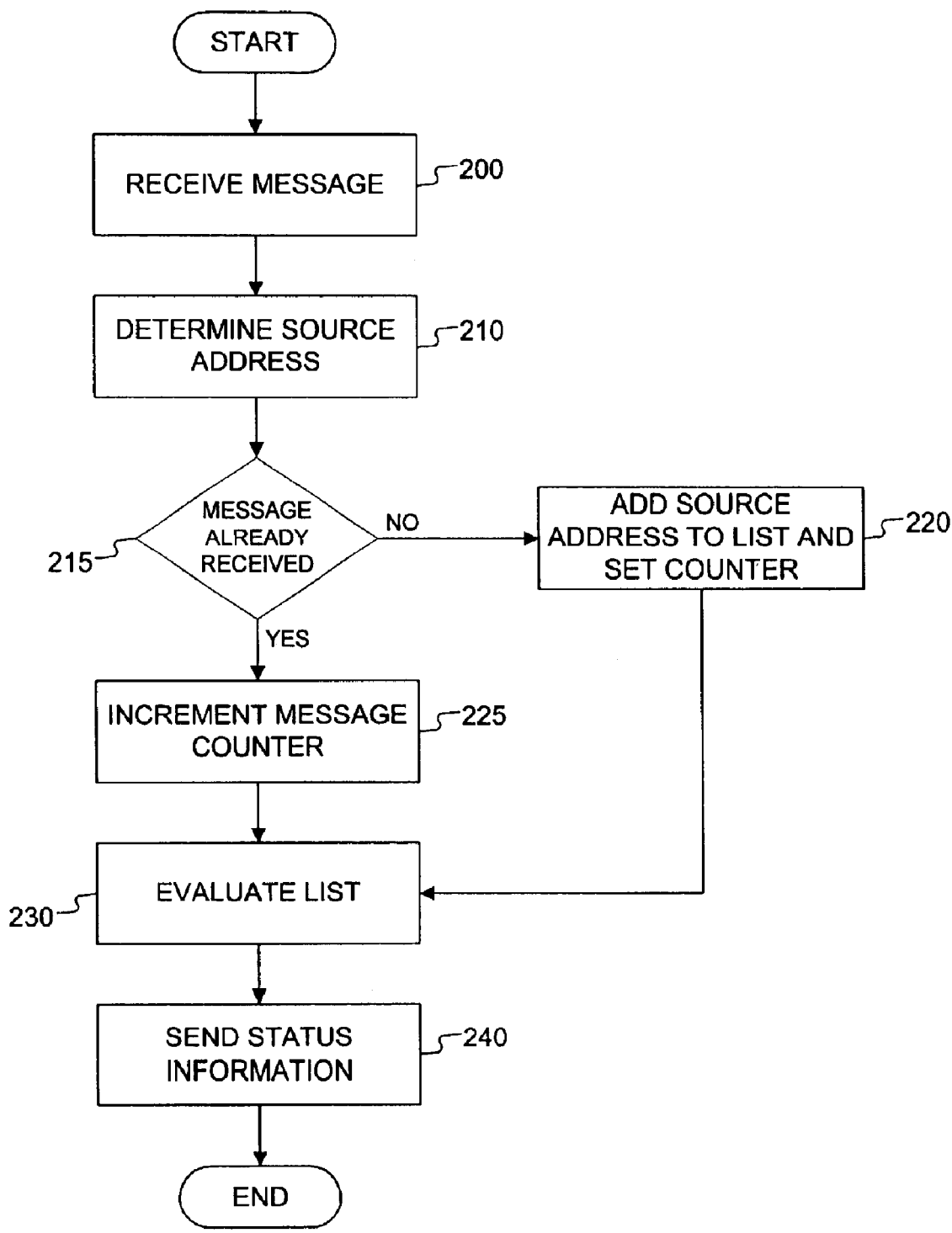
FIG. 2 is a flow chart of steps performed by an electronic service tool component, consistent with one exemplary embodiment of the present invention.

FIG. 2 illustrates a flow chart of a method for monitoring communication between machine 100 and ECM components 101–103, consistent with one exemplary embodiment of the present invention directed to J1939 technology. However, it should be understood that other method steps may be used, and even with the method depicted in FIG. 2, the particular order of events may vary without departing from the scope of the present invention. Further, certain steps may not be present, additional steps may be added, and the order of such steps may be modified without departing from the scope and spirit of the invention, as claimed.

As indicated in step 200, microprocessor 120 may receive a message via a datalink 122, 124, and 126. Microprocessor 120 may then determine the actual message source address, as illustrated by step 210. Microprocessor 120 will only recognize messages that are supported and expected by microprocessor 120. After microprocessor 120 determines that the message is supported, microprocessor 120 will determine whether a message has already been received from the source address (step 215). If the message has not yet been received from the particular source address, microprocessor 120 will add the source address to an address list and set a message counter associated with the source address to 1 (step 220). If, however, at least one message has been received from the source address in a predetermined time period, microprocessor 120 will increment the message counter associated with the source address (step 225). The address list and/or the message counter associated with each source address may be stored in storage device 130 or in some memory component of microprocessor 120. The number of reported source addresses may be limited to a predetermined value, such as 40. In this case, the first 40 source addresses to be reported will be stored, but subsequent messages from other source addresses will not be added to the address list.

In one exemplary embodiment, if the source address uses only the "Request PGN" message, such as the dash cluster, then the message counter associated with that source address may only track whether the message is received once. This embodiment permits devices that are not typically supported ECM components to be recognized.

At predetermined time intervals, the address list is evaluated by microprocessor 120 (step 230). An exemplary time interval may be 5.28 seconds (or 11 times 480 ms). This time interval may be set for any period that permits a sufficient number of messages to be received via datalinks 122, 124, and 126. For each of the source addresses supported and expected by microprocessor 120, microprocessor 120 determines, based on the message counter associated with each source address, whether at least one message has been received. If the message counter associated with a source address indicates one or more messages, then a status of "Received" is associated with the source address. If the message counter associated with a source address is zero, then a status of "Not received" is associated with the source address. The message counters associated with each source address are then reset to zero. In the exemplary embodiment described above that tracks the receipt of "Request PGN" messages, a status of "Detected one time" may be associated with the source address.

Each source address and associated status are then sent to display device 140 (step 240). Display device 140 provides the address and status information to a vehicle operator or technician, for example, by listing each of the addresses and statuses on a display screen. Alternatively, the information could be provided via a printout or via audio command or other similar method.

Figure 3:
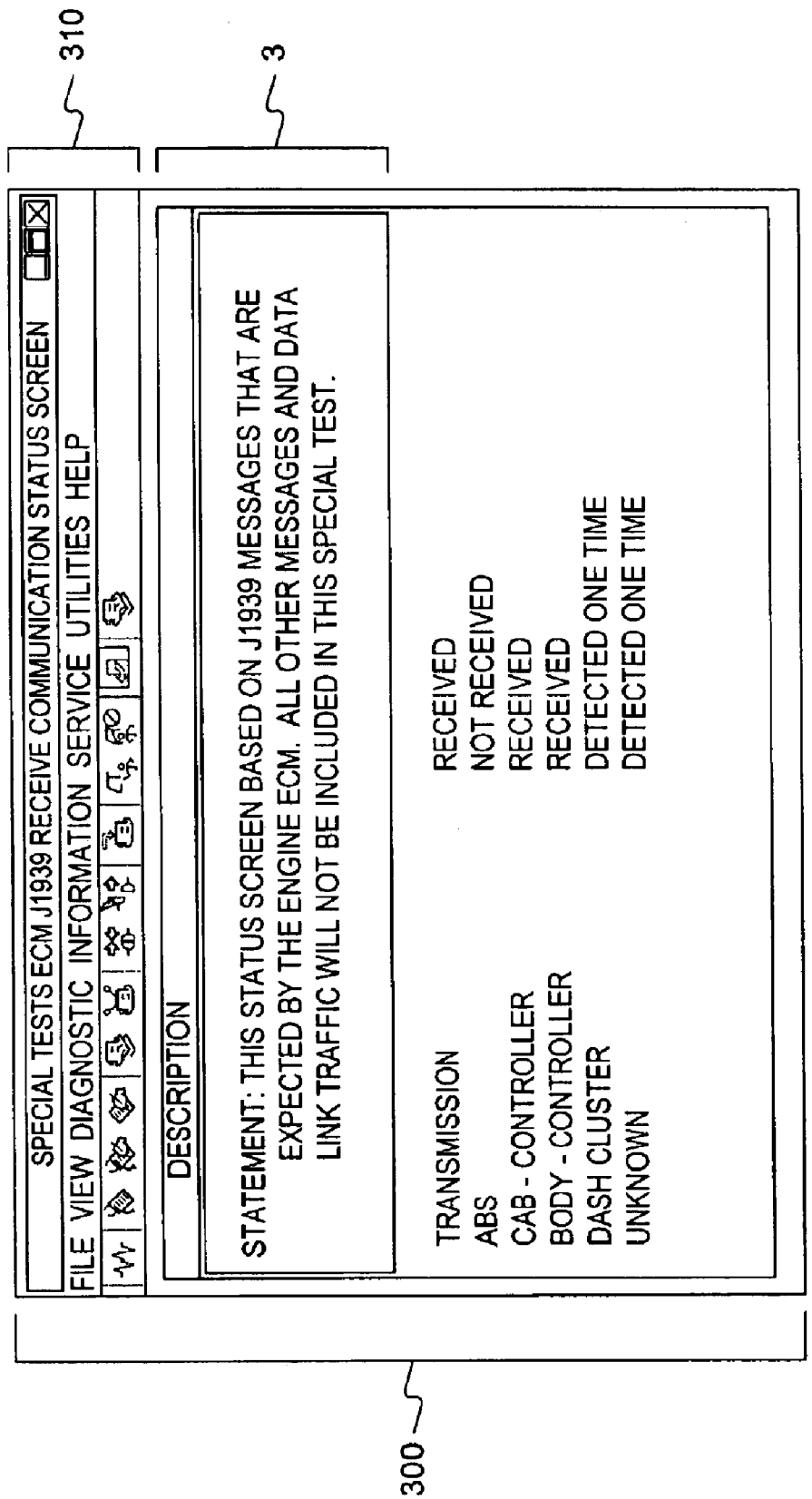
FIG. 3 is an exemplary interface of a display of the electronic service tool, consistent with one exemplary embodiment of the present invention.

FIG. 3 illustrates an exemplary interface 300 displayed via display device 140, consistent with one exemplary embodiment of the present invention. For example, icons 310 may be used to alter the display of the address and status information, such as by alphabetizing or otherwise sorting the results. Icons 310 may also provide access to other features of the electronic service tool 110. Display area 320 may display instructive or informative information, either about the tool in general or about the results being displayed. Display area 320 may display each source address along with its associated status, providing quick information to the operator or service technician about which datalinks are functioning properly.

Industrial Applicability

In operation, during startup of machine 100, microprocessor 120 may begin to receive messages from components 101–103 on datalinks 122–126. When microprocessor 120 receives a first message from component 101, for example, it will log information into storage device 130 regarding the sender of the message (e.g., component 101). Microprocessor 120 may also increment a counter associated with component 101. If microprocessor 120 receives further messages from component 101, microprocessor 120 may continue to increment the counter. Similarly, microprocessor 120 may track messages received from components 102 and 103. Microprocessor 120 may also display logged information on display device 140.

The system and method described may be a portion of an electronic service tool that also includes other functions. By providing a system and method for monitoring communications on the datalinks and determining whether communications have been received from a particular datalink, an operator or technician will be able to more accurately diagnose these types of problems, thus saving time otherwise spent on troubleshooting each of the various machine systems and components. Further, because the display provides easily understood information, it is more accessible for the operator or field technician that may not have as detailed a knowledge about the machine.

The system and method may be used during machine (e.g., vehicle) design and ECM component programming to ensure that the vehicle design and implementation allows for communication within a particular standard, such as, for example, the J1939 standard. It should be understood, that although the above description is directed toward a J1939 communication network in an on-highway truck, the system and method are applicable to other vehicles having a communication network including ECM components and datalinks.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method for monitoring communications in a machine including at least one electronic control module (ECM) component connected via at least one datalink, the method comprising:

receiving a message on a datalink;

determining a source address of the received message;

adding the received message to an address list based on the source address; and evaluating the address list to determine the status of a datalink associated with at least one ECM component.

2. The method of claim 1, further including:

determining if the received message is supported.

3. The method of claim 1, wherein evaluating the address list occurs at a predetermined time interval.

4. The method of claim 1, wherein adding the received message includes:

determining if the source address is present on the address list;

adding the source address to the address list if the determination is negative;

setting a message counter associated with the source address to 1 if the determination is negative; and incrementing a message counter associated with the source address by 1 if the determination is positive.

5. The method of claim 4, further including:

setting a message counter associated with the source address to "Received once" if the determination is negative and if the received message is "Request PGN".

6. The method of claim 4, wherein evaluating the address list includes:

determining a status associated with each source address in the address list.

7. The method of claim 6, wherein determining a status includes:

determining a status of "Not received" if a message counter associated with the source address is 0;

determining a status of "Received" if a message counter associated with the source address is 1 or more; and determining a status of "Received once" if a "Request PGN" message is received.

8. The method of claim 7, further including:

setting the message counter associated with the source address to zero.

9. The method of claim 7, further including:

displaying a list including each source address and the determined status for each source address.

10. The method of claim 1, further including:

communicating results based on the evaluation of the address list.

11. A system for monitoring communications in a machine including at least one electronic control module (ECM) component connected via at least one datalink, the system comprising:

an electronic service tool system, wherein the electronic service tool system includes a microprocessor configured to monitor communications in the machine by:

receiving a message on a datalink;

determining a source address of the received message;

adding the received message to an address list based on the source address; and evaluating the address list to determine the status of a datalink associated with at least one ECM component.

12. The system of claim 11, wherein the electronic service tool system further includes a storage device for storing an address list.

13. The system of claim 11, wherein the electronic service tool system further includes a display device for displaying results of monitoring the communication.

14. The system of claim 11, wherein the electronic service tool is mounted in the vehicle and is coupled with the datalinks.

15. The system of claim 11, wherein the electronic service tool is separate from the vehicle and is connected to a control microprocessor in the vehicle, which is connected to the datalinks.

16. A system for monitoring J1939 communications in a vehicle including electronic control module (ECM) components connected via datalinks, the system comprising:

a storage device for storing an address list;

a display device for displaying results of monitoring the communication; and an electronic service tool system, wherein the electronic service tool system includes a microprocessor configured to monitor J1939 communications in the vehicle by performing the steps of:

receiving a message on a datalink;

determining the source address of the received message;

adding the received message to an address list based on the source address; and evaluating the address list to determine the status of a datalink associated with one or more ECM component.

* * * * *